US012593226B2

(12) United States Patent
Sunila

(10) Patent No.: US 12,593,226 B2
(45) Date of Patent: Mar. 31, 2026

(54) IDENTIFYING STATIONARY USER DEVICES OF A COMMUNICATIONS NETWORK

(71) Applicant: Elisa Oyj, Helsinki (FI)

(72) Inventor: Karri Sunila, Helsinki (FI)

(73) Assignee: Elisa Oyj, Helsinki (FI)

( * ) Notice: Subject to any disclaimer, the term of this patent is extended or adjusted under 35 U.S.C. 154(b) by 352 days.

(21) Appl. No.: 18/558,375

(22) PCT Filed: Apr. 11, 2022

(86) PCT No.: PCT/FI2022/050231
§ 371 (c)(1),
(2) Date: Nov. 1, 2023

(87) PCT Pub. No.: WO2022/234178
PCT Pub. Date: Nov. 10, 2022

(65) Prior Publication Data
US 2024/0224079 A1      Jul. 4, 2024

(30) Foreign Application Priority Data

May 5, 2021    (FI) ..................................... 20215525

(51) Int. Cl.
*H04W 24/02* (2009.01)
*H04W 24/08* (2009.01)
(52) U.S. Cl.
CPC ........... *H04W 24/02* (2013.01); *H04W 24/08* (2013.01)
(58) Field of Classification Search
CPC .............................. H04W 24/02; H04W 24/08
See application file for complete search history.

(56) References Cited

U.S. PATENT DOCUMENTS

| | | |
|---|---|---|
| 2016/0187455 A1 | 6/2016 | Shah et al. |
| 2016/0242059 A1 | 8/2016 | Lopes et al. |
| 2018/0157884 A1* | 6/2018 | Visentin ............. G06Q 30/0239 |
| 2018/0206133 A1 | 7/2018 | Venkatraman et al. |
| 2018/0278347 A1 | 9/2018 | Bhattad et al. |
| 2022/0189241 A1* | 6/2022 | Helgesen ............ G07F 17/3241 |

OTHER PUBLICATIONS

Qualcomm Incorporated, Summary of [AT113-e][102][RedCap] RRM relaxations—Phase 3, 3GPP TSG-RAN WG2 Meeting #113bis-e, Online, Apr. 12-20, 2021, Agenda item: 8.12.3.2.
3GPP Organizational Partners, 3rd Generation Partnership Project; Technical Specification Group Radio Access Network; Study on support of reduced capability NR devices (Release 17), Technical report 38.875 (Mar. 2021).

* cited by examiner

*Primary Examiner* — Duc C Ho
(74) *Attorney, Agent, or Firm* — Espatent Oy

(57) ABSTRACT

A computer implemented method for identifying a stationary user device of a communications network by obtaining usage data from the communications network; analysing the usage data to check whether a user device fulfils the conditions of a stationary user device; responsive to finding that the user device fulfils said conditions of a stationary user device, concluding that the user device is stationary; and outputting information about the user device being stationary for the purpose of further analysis and/or management of the communications network. The conditions of a stationary user device require that the amount of data transmission to or from the user device exceeds a first threshold, and that the user device has been connected to a predefined maximum number or fewer base stations or cells.

20 Claims, 2 Drawing Sheets

301: Obtaining usage data

302: Analysing the usage data to check if a user device fulfils conditions of a stationary user device 303: responsive to finding that the user device fulfils the conditions of a stationary user device, concluding that the user device is stationary 304: Outputting information about the user device being stationary 301: Obtaining usage data 302: Analysing the usage data to check if a user device fulfils conditions of a stationary user device 303: responsive to finding that the user device fulfils the conditions of a stationary user device, concluding that the user device is stationary 304: Outputting information about the user device being stationary

IDENTIFYING STATIONARY USER DEVICES OF A COMMUNICATIONS NETWORK

TECHNICAL FIELD

The present disclosure generally relates to management of a communications network. The disclosure relates particularly, though not exclusively, to a method for identifying stationary user devices of a communications network.

BACKGROUND

This section illustrates useful background information without admission of any technique described herein representative of the state of the art.

Cellular communication networks are complex systems comprising a plurality of cells serving users of the network. When users of the communications network move in the area of the network, connections of the users are seamlessly handed over between cells of the network. There are various factors that affect operation of individual cells and co-operation between the cells. In order for the communications network to operate as intended and to provide planned quality of service, cells of the communications network need to operate as planned. For example, the cells need to provide sufficient coverage without too much interfering with operation of neighbouring cells.

In general, communications networks are monitored and managed so that necessary changes are made in the network to ensure quality of service to the user of the network. Management of the network and decisions (either automatic or manual) on necessary changes may be at least partially based on performance or measurement data obtained from user devices connected to the communications network. In some cases, it may be beneficial to use data obtained from stationary user devices as in such cases, movements of the user devices do not affect the data and the data therefore more reliably reflects the actual situation in the network.

One way to identify a stationary user device is to take user devices that are connected to only one cell over a specified monitoring period. Alternatively, billing address possibly combined with a subscription type of user devices could be used. This is not always optimal.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for identifying a stationary user device of a communications network.

In an example embodiment, the method is implemented by:

obtaining usage data from the communications network;

analysing the usage data to check whether a user device fulfils the following conditions of a stationary user device:

the amount of data transmission to or from the user device exceeds a first threshold, and the user device has been connected to a predefined maximum number or fewer base stations or cells;

responsive to finding that the user device fulfils said conditions of a stationary user device, concluding that the user device is stationary; and outputting information about the user device being stationary for the purpose of further analysis and/or management of the communications network.

In some example embodiments, the predefined maximum number is larger than 2.

In some example embodiments, the method further comprises using a first predefined maximum number for the base stations and a second predefined maximum number for the cells.

In some example embodiments, the first predefined maximum number is 3-4 and the second predefined maximum number is 8-10.

In some example embodiments, the usage data that is analysed comprises usage data collected over a predefined period of time.

In some example embodiments, the usage data that is analysed consists of usage data collected during working hours, during working days, during night time, and/or during day time.

In some example embodiments, the first threshold is 10 MB.

In some example embodiments, the method further comprises performing the analysis for a plurality of user devices concurrently or consecutively.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect there is provided a computer program comprising computer executable program code which when executed by at least one processor causes an apparatus at least to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

It has been noticed that even completely stationary user devices may use different cells of a communications network. The cell that the stationary user device is using may change for example due to changes in load of the network, weather conditions or the like. For this reason, identification of stationary user devices by taking user devices that are connected to only one cell over a specified monitoring period may produce rather limited amount of stationary user devices. Using billing address possibly combined with a subscription type of user devices, on the other hand, may provide quite inaccurate results as the user device is not necessarily located at the billing address.

To address these shortcomings, various embodiments of present disclosure provide specified conditions that need to be fulfilled in order to qualify as a stationary user device.

Figure 1:
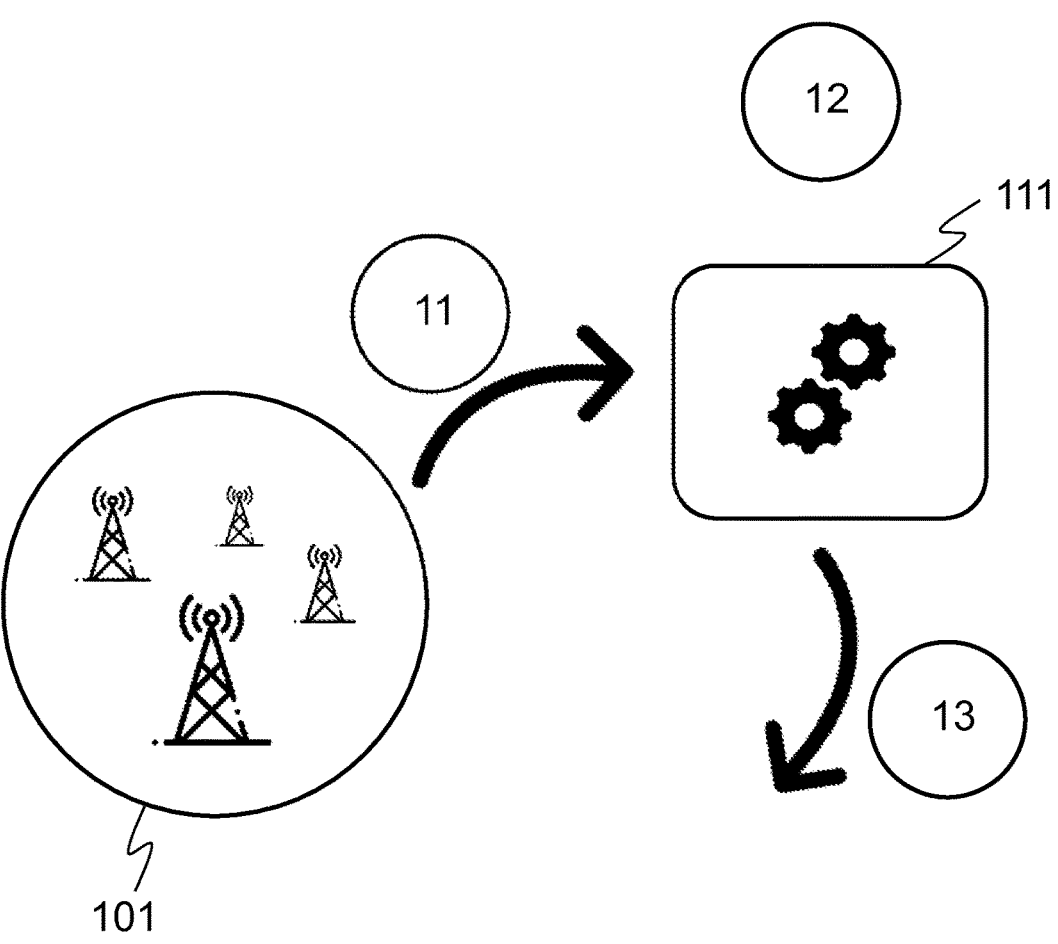
FIG. 1 shows an example scenario according to an embodiment.

FIG. 1 shows an example scenario according to an embodiment. The scenario shows a communications network 101 comprising a plurality of cells and base stations and other network devices. The communications network may comprise an operations support system, OSS, configured to manage operations of the communications network 101. Further, the scenario shows an automation system 111. The automation system 111 is configured to implement automated monitoring of operation of the communications network 101. The automation system 111 is operable to interact with the communications network, for example through the OSS for example to receive usage data from the communications network.

The automation system 111 is configured to implement at least some example embodiments of present disclosure.

In an example embodiment, the scenario of FIG. 1 operates as follows: In phase 11, the automation system 111 obtains at least usage data from the communications network. Also some other data may be obtained from the communications network or from other sources.

In phase 12, the usage data is automatically analysed in the automation system 111 to identify stationary user devices.

In phase 13, the results of the analysis are output for further processing. The results of the analysis may be shown on a display or otherwise output to a user or the results may be fed to automatic process configured to analyze operation of the communications network. Such automatic process may be implemented in the automation system 111 or elsewhere.

The analysis of the usage data may be automatically or manually triggered. The analysis may be periodically repeated. In an example case, the analysis is repeated every week or every 2-4 weeks.

Figure 2:
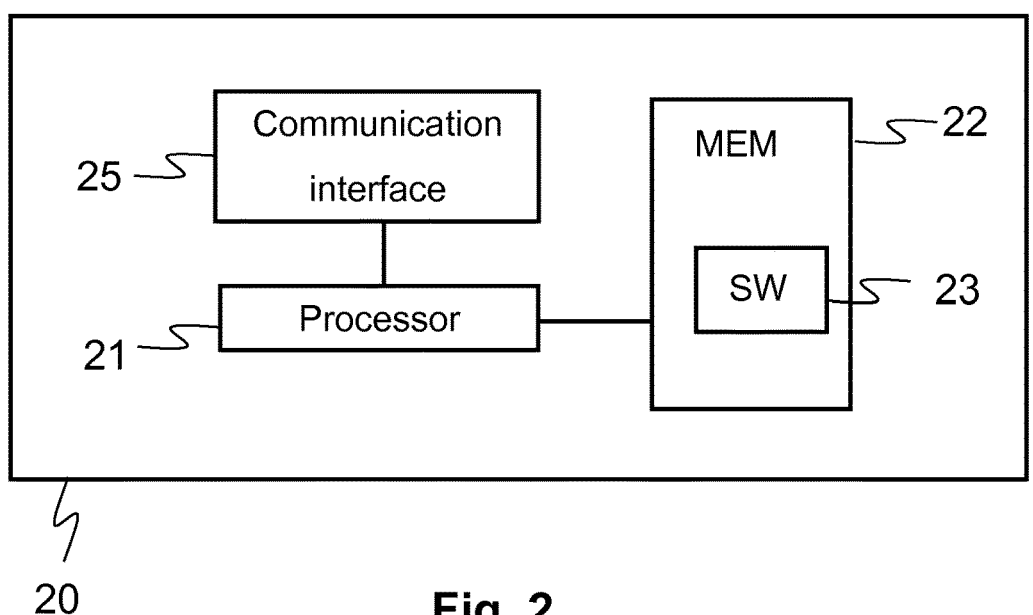
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of the invention.

That is, with suitable configuration the apparatus 20 is suited for operating for example as the automation system 111 of foregoing disclosure.

The apparatus 20 comprises a communication interface 25; a processor 21; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

Further, there may be a user interface configured for providing interaction with a user of the apparatus. Additionally or alternatively, the user interaction may be implemented through the communication interface 25. The user interface may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

Figure 3:
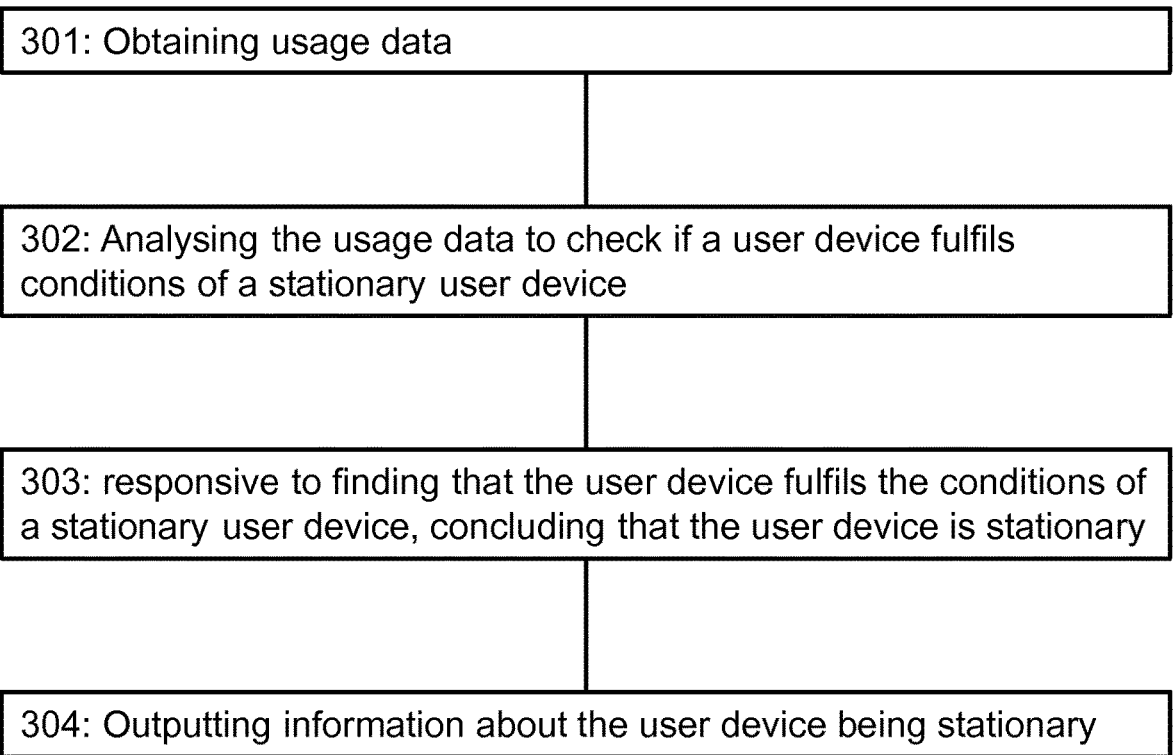
FIG. 3 shows a flow chart according to an example embodiment.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. The shown method comprises various possible process phases including some optional phases while also further phases can be included and/or some of the phases can be performed more than once.

Analysis related to a single user device is discussed in connection with FIG. 3. It is nevertheless clear that the analysis may be performed for a plurality of user devices concurrently or consecutively.

The method of FIG. 3 provides identifying a stationary user device in a communications network and comprises the following phases:

301: Usage data is obtained from the communications network.

The usage data comprises at least information about amount of data transfer and information about cells (and/or base stations) to which user devices have been connected. Also other data may be obtained, such as information about signal levels, information about signal quality, information about connection problems etc., but this is not mandatory.

302: The usage data is analysed to check whether a user device fulfils conditions of a stationary user device.

Fulfilling the conditions of a stationary user device requires that the amount of data transmission to or from the user device exceeds a first threshold. The first threshold may be for example 5-20 MB. In one example, the threshold is 10 MB. By requiring that there is data transfer to or from the mobile device, one achieves that mobile devices that are not in active use are not considered. Considering inactive user devices is not fruitful in further analysis of operation of the communications network as inactive user devices are not likely experience any problems or degraded service even if there were problems in the network.

Additionally, fulfilling the conditions of a stationary user device requires that the user device has been connected to a predefined maximum number or fewer base stations or cells. That is, the user device has been connected at most to the predefined maximum number of base stations (base station sites) or cells. The analysis may check the number of base stations or the number of cells or both of these. There may be different maximum number for the number of base stations and for the number of cells.

In an example embodiment, the predefined maximum number (or base stations or cells) is larger than 2. That is, being connected to single cell only is not required.

In an example embodiment, the predefined maximum number of base stations is 3-4 and the predefined maximum number of cells is 8-10. Only one of these or both of these may be applied. It is to be noted that one base station usually comprises more than one cell, for example three cells can be included in one base station. By applying smaller limit for the number of base stations than for the number of cells, one achieves that a user device that is connected for example to 8 cells of 8 different base stations does not qualify as a stationary user device. However, a user device that is using for example 8 different cells of 3 different base stations would qualify as a stationary user device.

By using the conditions of a stationary user device as defined in this disclosure, one achieves that stationary user devices can be identified with reasonable accuracy without having to use too strict or too vague definition.

In an example embodiment, the usage data that is analysed comprises usage data collected over a predefined period of time. The predefined period of time may be for example 2-4 weeks and more particularly, the predefined period may be 3 weeks. In this way it is ensured that the decision is not based on temporarily stationary user devices.

In an example embodiment, the usage data that is analysed consists of usage data collected during working hours, during working days, during night time, and/or during day time. That is, the usage data obtained from the communications network may be first filtered, before the analysis and identification of stationary user devices.

303: Responsive to finding that the user device fulfils the conditions of a stationary user device, it is concluded that the user device is stationary.

304: Information about the user device being stationary is output. The information may be provided for the purpose of further automatic or manual analysis and/or management of the communications network. For example, based on this information performance data obtained from the communications network may be filtered to include data related to stationary user devices. Such filtered data may then be used for analysing operation of the communications network for example for evaluating effects of changes made in the communications network and/or for deciding on actions or changes that are to be taken to improve operation of the communications network.

Certain example cases are discussed in the following:

Example 1: A router located in a living room of a house includes a traditional SIM card. The router serves the people living in the house and data is continuously transferred through the router. The router is stationary and so the SIM card is not moving around either. Nevertheless, the SIM card is connected to 7 different cells in a communications network during a 3-week monitoring period. Based on this simple analysis requiring connection to single cell would not identify the SIM card as a stationary user device, but by embodiments of the invention the SIM card is identified as a stationary user device as the conditions discussed in this disclosure are fulfilled.

Example 2: An employee is working remotely from home 5 days per week. The employee uses data connection of their mobile phone for network access during the working days. The mobile phone of the employee remains mainly stationary during the working hours and at the same time data is continuously transferred through the mobile phone. The mobile phone is connected to 8 different cells during working hours. By embodiments of the invention, wherein the usage data that is analysed consists of usage data collected during working hours or during working days, the mobile phone is identified as a stationary user device even if the mobile phone would move significantly for example during weekends, as the conditions discussed in this disclosure are fulfilled during working hours or during working days.

Without in any way limiting the scope, interpretation, or application of the appended claims, a technical effect of one or more of the example embodiments disclosed herein is that improved identification of stationary user devices is provided. Furthermore, one or more example embodiments may provide ability to identify stationary user devices that are not necessarily identified based on other methods. In this way, the amount of data that is associated with stationary user devices may increase. Based on this, accuracy of network monitoring and maintenance may be improved.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for identifying a stationary user device of a communications network, the method comprising:

obtaining usage data from the communications network;

analysing the usage data to check whether a user device fulfils the following conditions of a stationary user device:

the amount of data transmission to or from the user device exceeds a first threshold, and the user device has been connected to a predefined maximum number or fewer base stations or cells;

responsive to finding that the user device fulfils said conditions of a stationary user device, concluding that the user device is stationary; and outputting information about the user device being stationary for the purpose of evaluating effects of changes made in the communications network.

2. The method of claim 1, wherein the predefined maximum number is larger than 2.

3. The method claim 2, further comprising using a first predefined maximum number for the base stations and a second predefined maximum number for the cells.

4. The method of claim 3, wherein the first predefined maximum number is 3-4 and the second predefined maximum number is 8-10.

5. The method of claim 2, wherein the first threshold is 10 MB.

6. The method of claim 2, further comprising performing the analysis for a plurality of user devices concurrently or consecutively.

7. The method of claim 1, further comprising using a first predefined maximum number for the base stations and a second predefined maximum number for the cells.

8. The method of claim 7, wherein the first predefined maximum number is 3-4 and the second predefined maximum number is 8-10.

9. The method of claim 8, wherein the first threshold is 10 MB.

10. The method of claim 8, further comprising performing the analysis for a plurality of user devices concurrently or consecutively.

11. The method of claim 7, wherein the first threshold is 10 MB.

12. The method of claim 7, further comprising performing the analysis for a plurality of user devices concurrently or consecutively.

13. The method of claim 1, wherein the usage data that is analysed comprises usage data collected over a predefined period of time.

14. The method of claim 13, wherein the first threshold is 10 MB.

15. The method of claim 1, wherein the usage data that is analysed consists of usage data collected during working hours, during working days, during night time, and/or during day time.

16. The method of claim 15, wherein the first threshold is 10 MB.

17. The method of claim 1, wherein the first threshold is 10 MB.

18. The method of claim 1, further comprising performing the analysis for a plurality of user devices concurrently or consecutively.

19. An apparatus comprising:

a processor; and a memory including computer program code; the memory and the computer program code configured to, with the processor, cause the apparatus to perform the method of claim 1.

20. A non-transitory computer readable medium having stored there on a computer program comprising computer executable program code which, when executed by a processor causes an apparatus to perform the method of claim 1.

* * * * *